UNITED STATES PATENT OFFICE.

BENJAMIN F. BICKEL, OF ALAMEDA, CALIFORNIA.

PLASTIC COMPOSITION.

1,317,680.　　　　Specification of Letters Patent.　　Patented Oct. 7, 1919.

No Drawing.　　Application filed January 18, 1917.　Serial No. 143,062.

*To all whom it may concern:*

Be it known that I, BENJAMIN F. BICKEL, a citizen of the United States, and residing at Alameda, in the county of Alameda and State of California, have discovered a new property of matter and invented a new and useful Plastic Composition, of which the following is a specification.

This invention and discovery relates particularly to the addition of alumina to plastic compositions containing lime, particularly wall plaster and the like.

The object of this invention is to harden lime increasing its strength far above normal.

In the specification, the composition and the process of performing the same is disclosed in the form considered by me to be the best, but it is to be understood that the proportion and the manner of combining the ingredients may be varied within the purview of this invention, and it is also to be understood that in and by the claim following the description it is desired to cover the invention in whatever form it may be embodied.

I have discovered that the addition of alumina, preferably oxid of alumina, even in the small proportion of one per cent. of alumina to the lime content in compositions containing lime, that is about one part of alumina to one hundred parts of lime, combined with other ingredients, such as sand, or other fillers mixed with water in the usual proportions and manner, has the capacity of solidifying the mass into a hard plaster far exceeding in tensile strength lime compositions not containing the alumina.

In preparing the composition I prefer to mix the dry alumina or oxid of alumina with dry hydrated lime by mechanical combination and agitation best calculated to distribute the alumina uniformly through the mass. Aluminum sulfate requires a greater proportionate quantity, although sulfate and other forms of alumina are effective for the purpose in proper proportions to the lime content. This dry combination is then sacked or put in packages for trade consumption and may be mixed with the other ingredients in the usual manner at the point of application. Or the alumina may be mixed with "lime putty" and the other ingredients mixed with the putty in the usual manner. The combination of the dry alumina with the dry lime however is preferred before mixing with the other ingredients. These ingredients are then mixed with a quantity of water or a suitable liquid to form a paste or mortar of proper consistency to be plastered over the surface to be covered.

My composition has all the characteristics of lime plaster, plus the added strength due to the peculiar effect that alumina has in combination with lime to increase the strength of any composition in which these two ingredients are embodied, when permitted to set or crystallize in the usual manner.

Having thus described my invention, what I claim and desire to secure by Letters Patent is:

The combination of ninety nine parts of lime; one part of aluminum sulfate; a filler; and liquid to form a plastic mass.

In testimony whereof, I have hereunto set my hand at San Francisco, California, this 11th day of January, 1917.

BENJAMIN F. BICKEL.

In the presence of—
　BALDWIN VALE,
　A. J. HENRY.